US005798834A

United States Patent [19]
Brooker

[11] Patent Number: 5,798,834
[45] Date of Patent: Aug. 25, 1998

[54] INTERFEROMETRIC FIBER OPTIC METHOD AND APPARATUS FOR OBTAINING ABSOLUTE STATIC MEASUREMENT USING AN OPTICAL FREQUENCY-TIME PROFILE

[75] Inventor: John T. Brooker, Mogadore, Ohio

[73] Assignee: Loral Defense Systems, Akron, Ohio

[21] Appl. No.: 630,401

[22] Filed: Apr. 10, 1996

[51] Int. Cl.$^6$ .................................................. G01B 9/02
[52] U.S. Cl. .................. 356/345; 356/361; 250/227.27
[58] Field of Search ............................. 356/345, 361; 250/227.19, 227.27; 385/12, 14

[56] References Cited

U.S. PATENT DOCUMENTS

| 4,767,210 | 8/1988 | Kashyap | 356/345 |
| 5,402,230 | 3/1995 | Tian et al. | 356/345 |
| 5,452,086 | 9/1995 | Bunn | 356/345 |

*Primary Examiner*—Samuel A. Turner
*Attorney, Agent, or Firm*—Renner, Kenner, Greive, Bobak, Taylor & Weber

[57] ABSTRACT

A method and apparatus for obtaining absolute static measurement values of a physical influence includes a processor which controls the operation of a laser that generates an interferometer input signal which is submitted to an optical interferometer. The interferometer includes a coupler/splitter that splits the interferometer input signal into a reference arm and a sensing arm both of which are coupled to an appropriate physical influence. The sensing arm and the reference arm detect the status of the physical influence, whereupon the coupler/splitter generates an interferometer output signal received by the processor. The processor then correlates this interferometer output signal to an absolute static measurement value of the physical influence. A splitter is also employed to segment a portion of the interferometer input signal and employ this portion to correct the interferometer input signal and the interferometer output signal as determined by the processor. The interferometer may employ a cancellation technique to remove the inclusion of undesirable physical influences during the measurement of the desired physical influence.

26 Claims, 3 Drawing Sheets

INTERFEROMETRIC FIBER OPTIC METHOD AND APPARATUS FOR OBTAINING ABSOLUTE STATIC MEASUREMENT USING AN OPTICAL FREQUENCY-TIME PROFILE

TECHNICAL FIELD

The invention herein resides in the art of apparatus and techniques for obtaining absolute static measurement values of a physical influence. More particularly, the present invention relates to an apparatus and technique which employs an optical interferometer for generating a light signal that correlates to the absolute static measurement value of the physical influence being measured. Specifically, the present invention relates to such an apparatus and technique where a particular characteristic of the light signal generated by the interferometer correlates to an absolute static value of the physical influence being measured.

BACKGROUND ART

Sensors are employed to measure physical characteristics of various physical influences, such as pressure, temperature, electric and magnetic fields and the like. These measured values may be employed to control a process, operation or other function related to the physical influence. For example, in the pharmaceutical and food industries large volumes of different ingredients are first measured and then intermixed to obtain the desired end product. As such, various types of sensors are used to determine when a desired volume has been obtained. One method for measuring the height and volume of a liquid in a container is to measure the pressure difference above and below the surface of the liquid.

Sensors employed in the above industries generate a usable output in response to a monitored physical influence. Although currently known sensors are effective in their stated purpose, these sensors have certain limitations. In particular, current sensors often lack repeatability whenever there is a fluctuation in the physical influence beyond the recommended operational range of the sensor. For example, a sensor may read a value at a certain level, but will then read a different value at the certain level if the operational range has been exceeded. Still another limitation is that some sensors have inherent maintenance problems related, for example, to fluid-filled pressure transmission tubes. It will also be appreciated that sensors which employ electrical signals are subject to electromagnetic interference.

Fiber-optic interferometric sensors can potentially solve the above problems. Furthermore, interferometric sensors are advantageous in that they are relatively inexpensive, have a reduced weight, are rugged and are free from electromagnetic interference. Additionally, these types of sensors are extremely sensitive for the measurement of a wide range of physical influences and are capable of detecting very weak influences.

Interferometric sensors have been used effectively when the quantity or value to be measured is a deviation from some absolute ambient level. As such, interferometric sensors are useful where a changing influence is compared to an ambient value. For example, interferometric sensors are employed to measure underwater acoustic signals because the signal consists of deviations in water pressure from some ambient, hydrostatic pressure level. However, current interferometric sensors have not been adapted effectively when measuring the level of hydrostatic pressure itself. In other words, current interferometric sensors are deficient in measuring absolute static values of a physical influence.

Methods have been devised for the measurement of such absolute levels by employing compromised sensor configurations such as polarimeters, Fizeau interferometers, and non-linear strain geometries. Typically, these methods also require the use of difficult fabrication techniques to obtain precisely matched optical paths. Moreover, these methods require complex arrangements of associated equipment such as dual wavelength sources and mechanically modulated compensating interferometers. As a result, these sensor configurations are suitable only in laboratory environments.

Based upon the foregoing, it is evident there is a need in the art for an apparatus and related method that easily measures the absolute static value of a physical influence. Such an apparatus correlates a characteristic of the output signal, such as frequency or phase difference which is generated by exposure of the interferometer input signal to the physical influence, to an absolute static value of the physical influence.

DISCLOSURE OF INVENTION

It is a first aspect of the present invention to provide a method and apparatus for obtaining absolute static measurements.

Still another aspect of the present invention is to provide a method and apparatus for measuring absolute static values of a physical influence, wherein the measuring device is an interferometer.

Yet another aspect of the present invention, as set forth above, is to provide an interferometer that receives an interferometer input signal that is modified by the physical influence to be measured and generates an interferometer output signal.

Yet a further aspect of the present invention, as set forth above, is to provide a processor for monitoring and detecting the interferometer output signal, wherein the interferometer output signal is correlated to a value corresponding to the absolute or instantaneous static measurement value of the physical influence.

Still a further aspect of the present invention, as set forth above, is to provide an interferometer input signal with a known frequency-time profile that produces an interferometer output signal whose frequency correlates to the value of the measured physical influence.

Still another aspect of the present invention, as set forth above, is to provide an interferometer input signal with a known frequency-time profile that produces an interferometer output signal having two parts with a phase difference between those parts that correlates to the value of the measured physical influence as determined by the processor.

Still yet another aspect of the present invention, as set forth above, is to provide a splitter which receives the interferometer input signal and wherein one of the portions of the interferometer input signal is received by a signal corrector for removing undesirable characteristics in the interferometer input and output signals.

Still yet another aspect of the present invention, as set forth above, is to provide an interferometer that cancels out undesirable physical influences when measuring desirable physical influences.

The foregoing and other aspects of the invention which shall become apparent as the detailed description proceeds are achieved by a method for obtaining an absolute static measurement value of a physical influence, comprising the steps of: generating an interferometer input signal having a predetermined optical frequency-time profile; directing said interferometer input signal into an interferometer having a sensing element responsive to a physical influence, said physical influence modifying said sensing element and producing an optical phase shift that generates an interferometer output signal; detecting said interferometer output signal; and correlating said interferometer output signal to an absolute static measurement value of said physical influence.

Another aspect of the invention is an apparatus for obtaining an absolute static measurement value of a physical influence, comprising: means for generating an interferometer input signal having a known optical frequency-time profile; an interferometer receiving said interferometer input signal and exposing said interferometer input signal to a physical influence to generate an interferometer output signal; and a processor correlating said interferometer output signal with an absolute static measurement value of said physical influence.

Yet another aspect of the invention is an apparatus for obtaining an absolute measurement value of a physical influence, comprising: an electrical system comprising a laser controlled by a processor, said laser generating an interferometer input signal having a specific optical frequency-time profile; and an optical system comprising an interferometer connected to said electrical system, said interferometer coupled to a physical influence to generate an interferometer output signal received by a processor, said processor correlating said interferometer output signal with an absolute static measurement value of said physical influence.

Still another aspect of the invention is an apparatus for cancelling the effects of undesired physical influences on the measurement of a desired physical influence, comprising: an electrical system generating an interferometer input signal; an interferometer connected to said electrical system and receiving said interferometer input signal, said interferometer exposing said interferometer input signal to desired physical influences and undesired physical influences and generating an interferometer output signal, said interferometer cancelling the effects of said undesired physical influences; and a processor receiving said interferometer output signal to generate a measurement value corresponding to said desired physical influences.

Yet another aspect of the above invention is that the desired physical influences are pressures exerted by a liquid and a gas above the liquid and wherein the undesirable physical influences are temperatures associated with the liquid and the gas, the processor monitoring the interferometer output signal to determine a volume value associated with the liquid.

BRIEF DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
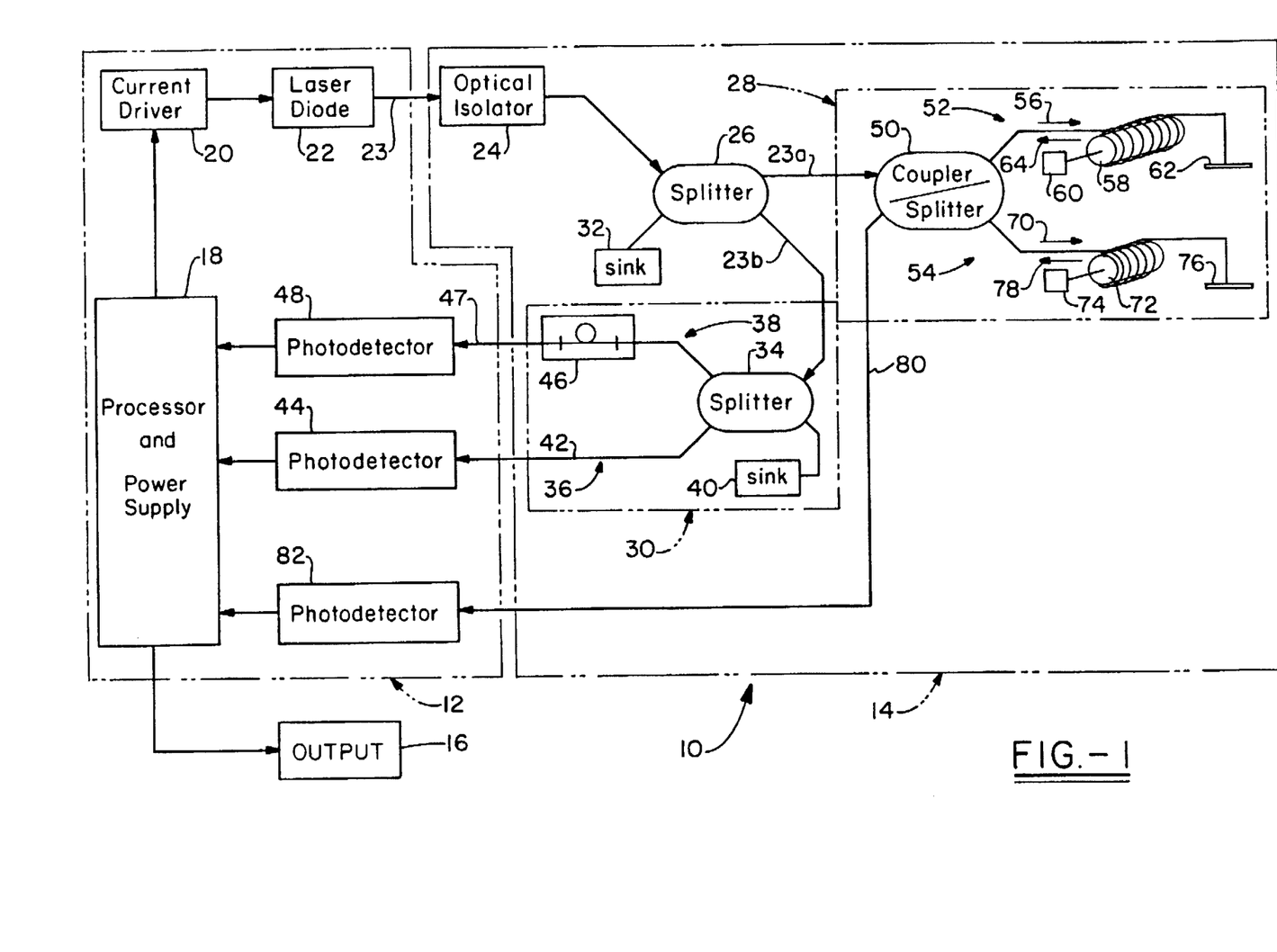
FIG. 1 is a schematic diagram of an apparatus employed to measure absolute static values of a physical influence.

Referring now to the drawings and more particularly to FIG. 1, it can be seen that an apparatus for obtaining absolute static measurements according to the present invention is designated generally by the numeral 10. In essence, the apparatus 10 is a modified version of a Michelson interferometer that includes an electrical system 12 connected to an optical system 14. Operation of the apparatus 10 results in an output 16 generated by the electrical system 12 for the purpose of displaying an absolute static measurement value obtained by the optical system 14 and controlling the operation of an associated device. Those skilled in the art will appreciate that the apparatus 10, with appropriate modifications, could include in place of the Michelson interferometer, a Mach-Zehnder or other type of interferometer to obtain the absolute static measurement value.

The apparatus 10 is a sensitive strain gauge that is used to sense and measure any physical influence that can be converted to a material strain within the optical fiber. The output 16 is proportional to the difference of the strains induced in the two sensing arms of the interferometer. As discussed previously, known interferometers are effective in determining a quantity that is a deviation from an absolute ambient level. However, only complex configurations of an interferometer in a laboratory environment have been able to measure an actual absolute level. It is one of the purposes of the present invention to instantaneously measure an immediate value of a physical influence without recording a deviation from the ambient level. In other words, the apparatus 10 generates a measurement value that actually represents the current state or condition of the physical influence being measured.

Figure 2:
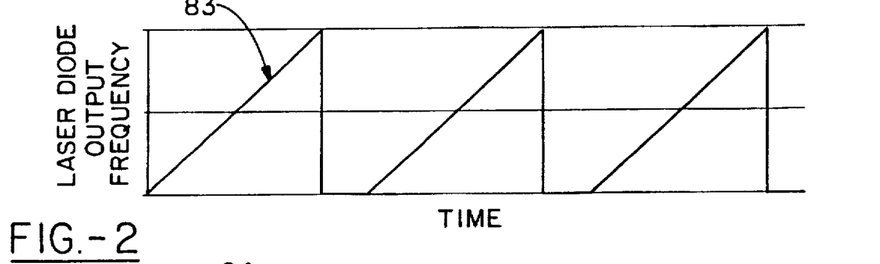
FIG. 2 shows a frequency-time profile of an interferometer input signal in the form of an optical frequency as a function of time generated by a laser employed in the present invention.
Figure 5:
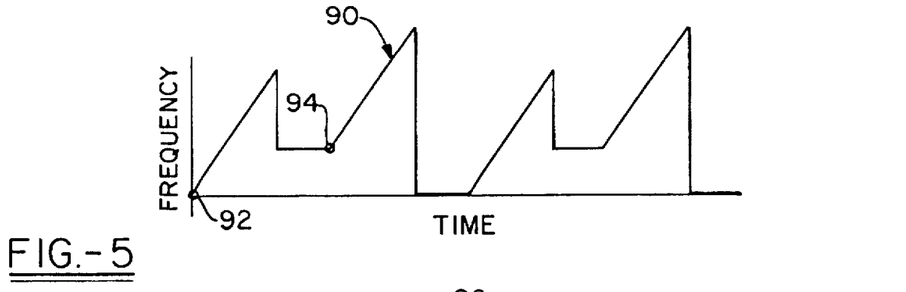
FIG. 5 shows a frequency-time profile for an alternative interferometer input signal in the form of an optical frequency as a function of time generated by the laser.

A processor/power supply 18 is included in the electrical system 12 and contains the necessary hardware, software and memory to control the operation of the apparatus 10. In particular, the processor/power supply 18 monitors the operational parameters, receives input instructions from the user and generates an output signal received and displayed by the output 16. The output signal may also be employed to control the operation of a device which is dependent upon the measured absolute static value of the physical influence. The processor/power supply 18 also generates the power required to operate the electrical system 12 and the optical system 14. A current driver 20 is connected to the processor/power supply 18 and generates a current waveform having the necessary shape, frequency, amplitude and other characteristics required for the operation of the apparatus 10. The current waveform is received by a laser diode 22 which generates a corresponding, monochromatic beam of light or interferometer input signal 23 having a predetermined optical frequency-time profile. It will be appreciated that other types of lasers with the appropriate control mechanisms may be employed to generate the interferometer input signal 23. Examples of the predetermined optical frequency-time profile of the interferometer input signal 23 are shown in FIGS. 2 and 5. Both of these profiles employ linear ramps, the importance of which will become apparent below.

An optical isolator 24, which is included in the optical system 14, receives the interferometer input signal 23 and transfers it to the remainder of the optical system. The optical isolator 24 functions as a one-way light flow valve to preclude light from being reflected back to the laser diode 22.

Connected to the optical isolator 24 is a splitter 26 which segments or partitions the interferometer input signal 23 into two portions identified as an interferometer input signal 23a and an interferometer input signal 23b. Input signal 23b, which is a minimal portion of the interferometer input signal 23, is re-directed to a signal corrector 30. An optical sink 32 is also connected to the splitter 26 and functions to absorb undesirable reflected light beams or signals generated by the interferometer 28 or the signal corrector 30.

The signal corrector 30 includes a splitter 34 which divides the input signal 23b into a compensation arm 36 and a linearization arm 38. An optical sink 40 is connected to the splitter 34 to absorb undesirable reflected light beams or signals generated by either arm 36 or 38. The signal corrector 30, along with the processor 18, removes undesirable characteristics in the interferometer input signal 23 and in the interferometer output signal 80 that might otherwise adversely affect the measurement accuracy of the system.

The compensation arm 36 transfers the input signal 23b to a photo-detector 44 for conversion to an electrical signal which is received by the processor 18. Those skilled in the art will appreciate that the current driver 20 generates a current ramp received by the laser diode 22 which in turn generates a beam of light with the optical frequency-time profile presented in FIG. 2. Unfortunately, the current ramp also generates undesirable amplitude variations in the interferometer input signal 23, which in turn produces the undesirable amplitude variations in the interferometer output signal shown in FIG. 3. As will be explained in further detail below, the processor 18 employs the corresponding electrical signal generated by the photo-detector 44 to remove the undesirable amplitude variations in the interferometer output signal 80, thereby preventing unwanted errors in the measurement of the physical influence.

The linearization arm 38 includes a test interferometer 46 that generates a beat signal 47 received by a photo-detector 48 for conversion to an electrical signal received by the processor 18. Non-linearities in the optical frequency-time profile of the interferometer input signal 23 cause phase shifts in the beat signal 47. The processor 18 then compares the phase of signal 47 to the phase of an independent stable electrical signal of equal frequency and adjusts the shape of the current ramp delivered to the laser diode 22. The technique removes any non-linearities in the optical frequency-time profile of the interferometer input signal 23. Those skilled in the art will appreciate that a linear drive current ramp produces an undesirable non-linear optical frequency-time profile which generates errors in the measurement of the physical influence. In order to remove these errors, the current driver 20 can be manually calibrated to produce a non-linear drive current ramp which in turn produces a desirable linear optical frequency-time profile. This calibration may be done with empirical data derived from the operation of the current driver 20 and the laser diode 22. However, in the preferred embodiment, the linearization arm 38 and the processor 18 automatically control the operation of the current driver 20, depending upon the phase of the electrical signal generated by the photo-detector 48, to generate the desired non-linear current ramp. In turn, the laser diode 22 generates the desired linear optical frequency-time profile of the interferometer input signal 23. As a result, the linearization arm 38 prevents unwanted distortions in the measurement of the physical influence.

The input signal 23a, which is a maximal portion of the interferometer input signal 23, is received by a coupler/splitter 50 of the interferometer 28. The coupler/splitter 50 is connected to a reference arm 52 and a sensing arm 54. The coupler/splitter 50 divides the input signal 23a into equal amplitude incident signals or beams of light. In particular, the reference arm 52 receives a reference incident signal 56 on an optical fiber that may be exposed to a reference element 58 that is acted upon by a reference physical influence 60. The optical fiber carrying the reference incident signal 56 is terminated at a reference mirror 62 which reflects and generates a reference arm return signal 64 that is received by the coupler/splitter 50. In a similar manner, the sensing arm 54 receives a sensing incident signal 70 on an optical fiber that is exposed to a sensing element 72 that is acted upon by a sensing physical influence 74. The optical fiber carrying the sensing incident signal 70 is terminated at a sensing mirror 76 which reflects and generates a sensing arm return signal 78 that is received by the coupler/splitter 50. In the preferred embodiment, the mirrors 62 and 76 are Faraday rotator mirrors that eliminate the problem of polarization fading. Depending upon the application and the physical influence monitored by the sensing arm 54, the reference arm 52 may not be exposed to any physical influence. Those skilled in the art will appreciate that the reference element 58 and the sensing element 72 are materials that undergo a known strain depending upon the absolute static value of the physical influence in association therewith. The physical influences 60 and 74 can be pressure, temperature, electric fields, magnetic fields or any quantifiable physical property. The lengths of the reference arm 52 and the sensing arm 54 are determined by the parameters and specifications of the measurement process and by the operational parameters of the processor 18. The reference arm 52 and sensing arm 54 are typically unbalanced or have slightly different lengths in order to obtain a measurable output that correlates to a static value of the physical influence being measured. The additional strain imparted by the physical influence further adds to the degree of imbalance which correlates to the static value of the physical influence to be measured and also to a characteristic of the interferometer output signal 80.

The coupler/splitter 50 divides the interferometer input signal 23a into two equal portions identified as the reference incident signal 56 and the sensing incident signal 70. After the incident signals 56 and 70 are exposed to the appropriate physical influences and respective mirrors 62 and 76, the return signals 64 and 78 are received by the coupler/splitter 50 and combined to generate the interferometer output signal 80. In other words, the reference incident signal 56, which generates the reference arm return signal 64 with known characteristics, is combined with the sensing arm return signal 78, which has been altered or modified by the physical influence 74, to generate the interferometer output signal 80 that has a characteristic which is correlated to an absolute static value of the physical influence being measured. This characteristic may be a beat frequency or a phase difference that results from an optical phase shift within the interferometer. The coupler/splitter 50 then transfers the interferometer output signal 80 to the electrical system 12.

A photo-detector 82 receives the interferometer output signal 80 and converts this signal to an electrical signal that is received by the processor/power supply 18. Accordingly, the processor 18 correlates the interferometer output signal 80 to an absolute static measurement value of the difference in the sensed physical influences 60 and 74.

Figure 3:
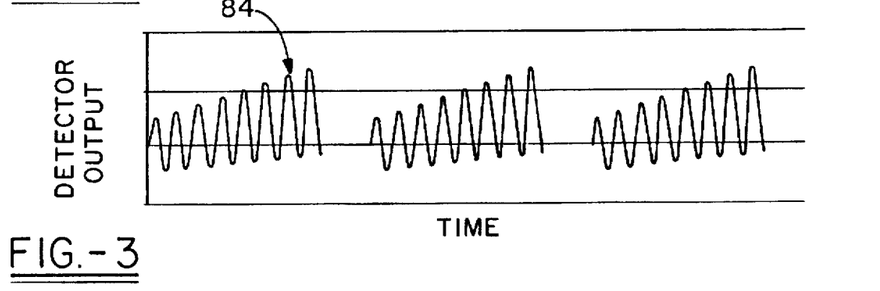
FIG. 3 shows an interferometer output signal as received by a photo-detector, wherein the effects of the laser amplitude variations are uncompensated.
Figure 4:
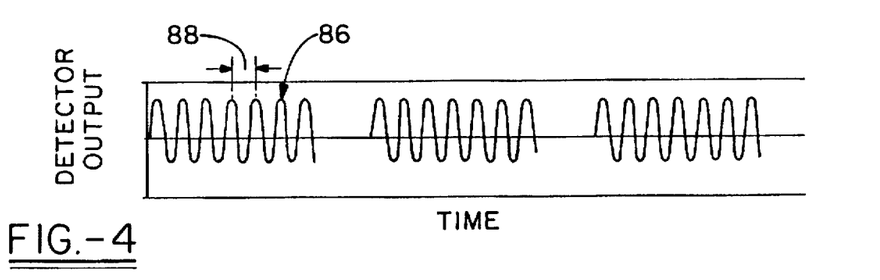
FIG. 4 shows the interferometer output signal after correction by a processor.

To illustrate how the apparatus 10 obtains absolute measurement values, reference is now made to FIGS. 2–6. As seen in FIG. 2, the output of the laser diode 22 is designated generally by the numeral 83 and has a sawtooth ramp frequency-time profile. Each ramp of the sawtooth produces an interferometer output signal 80 consisting of a burst of light intensity oscillations at the output of the coupler/splitter 50. Those skilled in the art will appreciate that the frequency-time profile of the laser diode output could also be in the form of a triangular wave instead of a sawtooth wave. In particular, FIG. 3 illustrates an uncompensated detector output signal designated by the numeral 84 and received by the photo-detector 82. The uncompensated detector output signal 84 has an increasing amplitude during the increasing portion of the sawtooth ramp 83. By virtue of this increasing amplitude, an error would be introduced in the calculation of the absolute static value of the difference of the physical influences 60 and 74. However, as seen in FIG. 4, with the compensation arm 36 connected to the photo-detector 44, the processor 18 generates a constant amplitude detector output signal 86. This compensation is achieved by dividing the detector output signal 84 by the output of photo-detector 44. In other words, the signal corrector 30, through the compensation arm 36, adjusts the interferometer output signal 80 based upon the amplitude of the interferometer input signal 23. By virtue of the slightly unbalanced configuration of the reference arm 52 and sensing arm 54, the interferometer 28 generates a series of oscillations which correspond to the increasing slope of the sawtooth ramp 83. It has been determined that the frequency of these oscillations is linearly related to the interferometer imbalance and therefore to the absolute static value of the physical influence to be measured. In other words, a period 88 correlates to the absolute static measurement value of the physical influence 74. As such, any change in the frequency or the period 88 is determined by the processor 18 for each succeeding sawtooth ramp and a new absolute static measurement value is generated. Accuracy of the measurement can be improved in many ways. One way is to average the measurement of the period 88 over many cycles within a single burst. Another way is to average the measured values of the physical influence obtained from several bursts. Of course, the value determined by the processor 18 can be employed as a control mechanism for operating any type of manufacturing equipment that is dependent upon the status of the physical influences 60 and 74.

Figure 6:
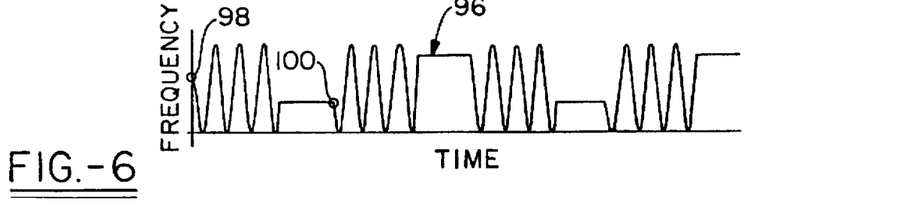
FIG. 6 shows an alternative interferometer output signal corresponding to the alternative interferometer input signal shown in FIG. 5 after amplitude correction by the processor.

The second technique for determining an absolute measurement value of a physical influence is shown in FIGS. 5 and 6, wherein the laser diode 22 generates a double sawtooth ramp optical frequency-time profile designated generally by the numeral 90. The double sawtooth ramp profile 90 includes a series of pairs of linear ramps of equal slope having alternating low and starting high levels. In this embodiment, instead of measuring the frequency of the output oscillations, the processor 18 detects a phase difference of the interferometer output signal 80. In particular, the double sawtooth ramp profile 90 has an alternating low and high starting point with the low starting point designated by numeral 92 and the high starting point designated by the numeral 94. It will be appreciated that the connection of the signal corrector 30 to the processor 18 functions as in the previous technique to compensate for the undesirable characteristics in the interferometer input signal 23 and the interferometer output signal 80. As seen in FIG. 6, the interferometer output signal 80 is represented by the numeral 96 and has alternating pairs of oscillation bursts of equal frequency, but with a relative phase difference that is linearly related to the absolute static level of the difference of the physical influences 60 and 74 monitored by the reference arm 52 and the sensing arm 54. The value of the absolute static level is inferred from a measurement of the relative phase of two successive bursts by comparing a starting point or phase angle 98 which corresponds to the starting point 92 and a starting point or phase angle 100 which corresponds to the starting point 94. The processor 18 calculates this phase difference and linearly relates the phase difference to the absolute static measurement value of the difference of the physical influences 60 and 74.

Thus it will be appreciated from the operation of the apparatus 10 that various types of input signals to the laser diode 22 can generate an interferometer input signal 23 that is modified or altered by physical influences 60 and 74 and wherein the interferometer output signal 80 has a characteristic that is linearly related to a static absolute value of the physical influence. Moreover, the apparatus 10 does not have the limitations associated with previous complex fiber-optic pressure sensor implementations and can provide instantaneous readings upon actuation of the apparatus 10. It will be appreciated that the concepts herein can be employed in determining absolute measurement values of various types of physical influences such as pressure, temperature, and electrical and magnetic fields to name a few. It will further be appreciated that the apparatus 10 is equally capable of obtaining dynamic measurement values, such as changes from a known ambient value. Such a use could be employed in torpedo depth sensing and in determining submarine depth.

Figure 7:
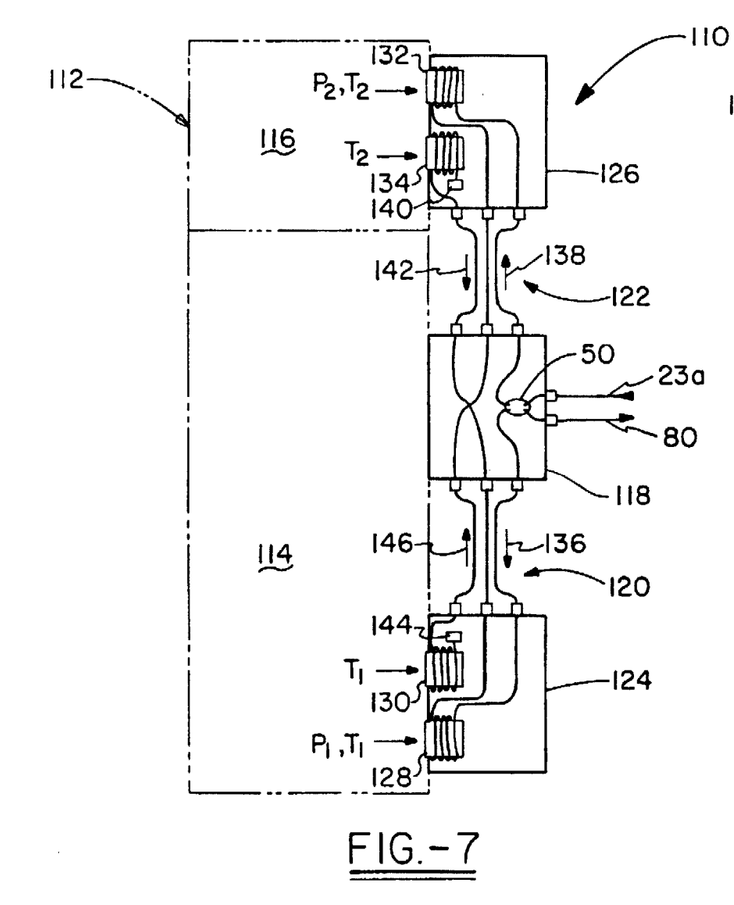
FIG. 7 is a schematic diagram of a tank wherein the present invention is employed to determine pressure and volume values of a liquid contained therein.

Referring now to FIG. 7, a specific method and apparatus for measuring differential pressure across a liquid surface is designated generally by the numeral 110. As shown, the apparatus 110 includes a tank 112 which contains a liquid 114 and a gas 116 above the liquid 114. Those skilled in the art will appreciate that there is an inlet and an outlet to allow for the ingress and egress of the liquid 114 from the tank 112. The flow of the liquid 114 may be controlled by the processor/power supply 18 presented in FIG. 1. As seen in FIG. 7, the apparatus 110 employs the interferometer input signal 23a, the coupler/splitter 50 and the interferometer output signal 80 discussed above. In this embodiment, the apparatus 110 is employed to determine an absolute value of the difference in static pressures in the liquid 114 and in the gas 116 at the respective sensor locations. The difference between the two pressure values can be employed to determine the volume of liquid in the tank 112.

The apparatus 110 includes a central housing 118 which contains the coupler/splitter 50 that receives and divides the interferometer input signal 23a into a liquid sensing arm 120 and a gas sensing arm 122. Mounted to the tank 112 is a liquid sensor housing 124 and a gas sensor housing 126, both of which are interconnected to the central housing 118 by the liquid sensing arm 120 and the gas sensing arm 122, respectively. The housings 118, 124 and 126 provide the optical connections required for the interconnection of the optical fibers therebetween.

The liquid sensor housing 124 contains a pressure sensing device 128 and a temperature sensing device 130. The pressure sensing devise 128 is exposed to and is modified by the physical influence of the pressure $P_1$ and the temperature $T_1$ of the liquid 114. The temperature sensing device 130 is only exposed to and modified by the temperature $T_1$ of the liquid 114.

The gas sensor housing 126 contains a pressure sensing device 132 and a temperature sensing device 134. The pressure sensing device 132 is exposed to and is modified by the physical influence of the pressure $P_2$ and the temperature $T_2$ of the gas 116. The temperature sensing device 134 is only exposed to and modified by the temperature $T_2$ of the gas 116. It will be appreciated that the liquid sensor housing 124 and the gas sensor housing 126 are identical structures and are therefore interchangeable, thereby simplifying a spare parts inventory.

The coupler/splitter 50 divides the interferometer input signal 23a into a liquid incident signal 136, which is received by the liquid sensing arm 120, and a gas incident signal 138 which is received by the gas sensing arm 122. The liquid incident signal 136 is transferred by optical fiber to the pressure sensing device 128, through the central housing 118 and to the temperature sensing device 134. The liquid incident signal 136 is reflected by a mirror 140 to generate a liquid reflected signal 142 that is returned through the temperature sensing device 134, the pressure sensing device 128 and which is received by the coupler/splitter 50. Similarly, the gas incident signal 138 is transferred by optical fiber to the pressure sensing device 132, through the central housing 118 and to the temperature sensing device 130. The gas incident signal 138 is reflected by a mirror 144 to generate a gas reflected signal 146 that is returned through the temperature sensing device 130, the pressure sensing device 132 and which is received by the coupler/splitter 50. The liquid reflected signal 142 and the gas reflected signal 146 are combined by the coupler/splitter 50 to generate the interferometer output signal 80 which is processed in the manner described above.

In this embodiment, the optical fiber in the liquid sensing arm 120 and the gas sensing arm 122 are wound on and bonded to the circumferential surfaces of identical elastomeric disks represented by the devices 128 through 134. The elastomeric disks are chosen for their material properties such that any change in pressure or temperature that is applied to the disk creates a dimensional change therein which, of course, causes a deformation of the fiber wound around the elastomeric material. Those skilled in the art will appreciate that the elastomeric disks should have a low Young's modulus and a Poisson's ratio of about 0.5 for efficient conversion of axial stress to radial strain.

As seen in FIG. 7, a pressure $P_1$ applied directly to the flat base of the pressure sensing device 128 or indirectly through a diaphragm or piston to the flat base of the pressure sensing device 128 causes a positive strain in the liquid sensing arm 120 proportional to $P_1$. In a similar manner, a pressure $P_2$, applied to the pressure sensing device 132 causes a positive strain in the gas sensing arm 122 proportional to $P_2$. If the proportionality factors for the two sensing arms 120 and 122 are matched, then the output of the interferometer output signal 80 is linearly related to the pressure difference $P_1-P_2$. However, there are also positive strains induced in the sensing devices 128 and 132 by thermal expansion associated with temperatures $T_1$ and $T_2$ in FIG. 7. These temperature-induced strains may be caused by the temperature of the liquid 114 held in the tank 112, the operating environment in which the tank 112 is contained, the flow of liquid 114 into and out of the tank 112 or by other factors. If uncompensated, these temperature-induced strains cannot be differentiated from the pressure-induced strains that are to be measured. In order to compensate for this unwanted variation, the temperature sensing devices 130 and 134 are incorporated into the present embodiment. It will be appreciated that the pressure sensing devices 128 and 132 must have the same pressure-strain sensitivity and that the devices 128 through 134 must have the same thermal expansion characteristics. The temperature sensing devices 130 and 134 have no sensitivity to pressure. The devices 128 and 130 are exposed to the same temperatures $T_1$. Likewise, devices 132 and 134 are exposed to the same temperature $T_2$. As those skilled in the art will appreciate, the temperature-induced strains in devices 128 and 132 are thus compensated for or "cancelled out" and only optical signals representative of the pressure difference $P_1-P_2$ are submitted to the coupler/splitter 50. As such, the interferometer output signal 80 output by the apparatus 110 is proportional to the difference of the pressures corresponding to the liquid 114 and the gas 116 with no contribution from thermally-induced strains.

As discussed in the embodiment shown in FIG. 1, the interferometer output signal 80 is then submitted to a processor 18 to measure a particular characteristic of the interferometer output signal 80 which is then correlated to the absolute static measurement value of the pressure difference $P_1-P_2$. Those skilled in the art will appreciate that with the coupler/splitter 50 located in the central housing 118, strains induced in the fibers that interconnect the housings 118, 124 and 126 are partially cancelled by common-mode rejection. Each of the housings 124 and 126 are provided with single mode connectors to facilitate the interchangeablity therebetween. This reduces maintenance and replacement costs if one of the housings becomes inoperative. It will also be appreciated that the central housing 118 may contain the laser diode 22, the optical isolator 24, the splitter 26, the signal corrector 30 and the photo-detectors 44, 48 and 82 all of which may communicate with the processor/power supply 18 through an electrical cable. It is also envisioned that all of the aforementioned components including the processor/power supply 18, could be placed in the housing 118 with only power-in and measurement-out connections being required.

Figure 8:
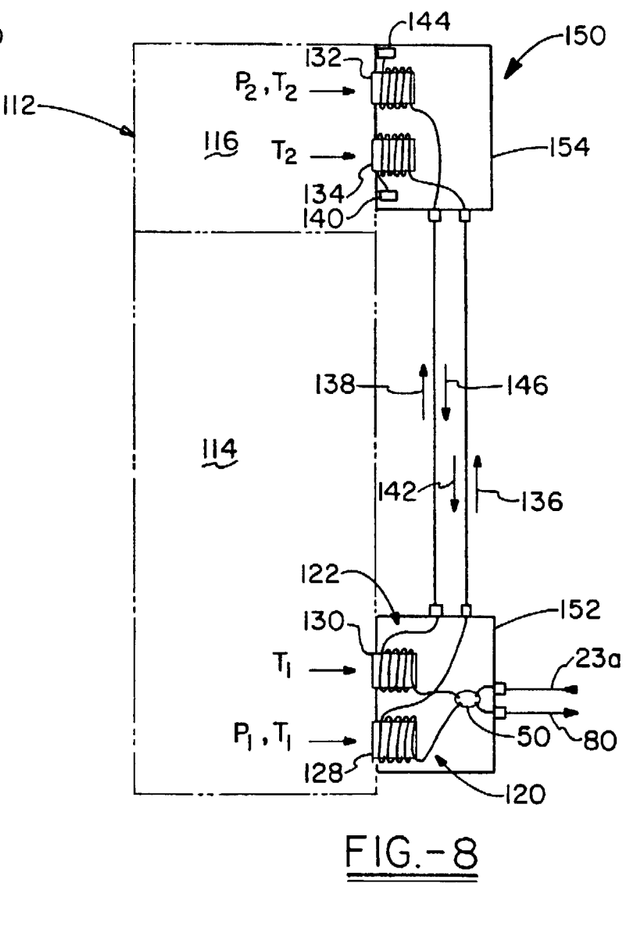
FIG. 8 is a schematic diagram of a tank employing an alternative interferometer arrangement to determine pressure and volume values of a liquid contained therein.

Referring now to FIG. 8, another method and apparatus for measuring differential pressure across a liquid surface is designated generally by the numeral 150. The apparatus 150 includes an input-output housing 152 and a termination housing 154. The input-output housing 152 includes at least the coupler/splitter 50, the pressure sensing device 128 and the temperature sensing device 130. The termination housing 154 includes at least the pressure sensing device 132, the temperature sensing device 134 and the mirrors 140 and 144. The apparatus 150 functions in a manner similar to the apparatus 110. The primary difference between apparatus 150 and apparatus 110 is that only two housings are employed. As such, the apparatus 150 only requires two optical fibers between housings 152, 154 instead of two sets of three optical fibers between the housings 118, 124 and 126. Accordingly, the path of the gas sensing arm 122 is slightly different in that the gas incident signal 138 is exposed to the temperature sensing device 130 before it is exposed to the pressure sensing device 132. The path of the liquid sensing arm 120 is similar to the previous embodiment in that the liquid incident signal 136 is first exposed to the pressure sensing device 128 and then to the temperature sensing device 134. However, the cancellation effect of the temperature-induced strains is still obtained. The primary advantage of this configuration is that a perfect common mode rejection of unwanted noise in the fibers connecting the input-output housing 152 and the termination housing 154 is obtained. It will be appreciated that a portion of or all of the electrical system 12 can be included in the input/ output housing 152.

The apparatuses 110 and 150 provide long-life and no need for pressure transmission fluids as is common with current sensing devices employed to determine a volume of liquid in a tank. Other advantages associated with the present invention include a fiber-optic system that precludes having electronics in contact with processed fluid and that provides inherent temperature compensation. The apparatuses 110 and 150 also provide a unique temperature compensation technique that eliminates the adverse effects of temperature when determining a value for pressure within a tank. It will be appreciated that this technique is equally applicable wherever the reading of one physical influence is adversely impacted by a second physical influence.

Thus it can be seen that the objects of the invention have been satisfied by the structure and methodology presented above. The apparatus 10 can be operated with various types of input signals that generate measurable output signals, wherein the output signal is correlated to the absolute static physical measurement value. It will be appreciated that this measurement value can be employed to operate or control other pieces of equipment as desired by the end user.

While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A method for obtaining an absolute static measurement value of a physical influence, comprising the steps of:

generating an interferometer input signal having an optical frequency-time profile that is a series of linear ramps of equal slopes having alternating low and high starting points;

directing said interferometer input signal into an interferometer having at least one sensing element responsive to a physical influence, said physical influence modifying said sensing element and producing an optical phase shift that generates an interferometer output signal;

detecting said interferometer output signal; and correlating said interferometer output signal to an absolute static measurement value of said physical influence.

2. The method according to claim 1, further comprising the steps of:

splitting a portion of said interferometer input signal into a minority portion and a majority portion; and correcting said interferometer output signal with said minority portion to remove undesirable amplitude modulation in said interferometer output signal.

3. The method according to claim 1, further comprising the steps of:

splitting a portion of said interferometer input signal into a minority portion and a majority portion; and correcting said interferometer input signal with said minority portion to remove undesirable non-linearity of the frequency-time profile of said interferometer input signal.

4. The method according to claim 3, further comprising the steps of:

directing said majority portion of said interferometer input signal to a coupler/splitter to generate a reference incident signal and a sensing incident signal;

directing said reference incident signal to a reference mirror to generate a reference arm return signal;

directing said sensing incident signal to said sensing element responsive to said physical influence and to a sensing mirror to generate a sensing arm return signal; and combining said reference arm return signal and said sensing arm return signal to generate said interferometer output signal.

5. The method according to claim 4, wherein said predetermined optical frequency-time profile is one chosen from a group consisting of a sawtooth ramp and a triangular wave.

6. The method according to claim 5, wherein said step of detecting further comprises the step of measuring a frequency of said interferometer output signal, wherein said frequency of said interferometer output signal is correlated to the absolute static measurement value of said physical influence.

7. The method according to claim 4, wherein said reference mirror and said sensing mirror are Faraday rotator mirrors.

8. The method according to claim 1, wherein said step of detecting further comprises the step of measuring a phase difference of alternating bursts of said interferometer output signal, wherein said phase difference of said interferometer output signal correlates to the absolute static measurement value of said physical influence.

9. An apparatus for obtaining an absolute static measurement value of a physical influence, comprising:

means for generating an interferometer input signal having an optical frequency-time profile in the form of a series of linear ramps of equal slopes having alternating low and high starting points;

an interferometer receiving and exposing said interferometer input signal to a physical influence; and a processor for correlating a characteristic of said interferometer output signal with an absolute static measurement value of said physical influence.

10. The apparatus according to claim 9, further comprising:

a splitter receiving said interferometer input signal and splitting said interferometer input signal into a minority portion and a majority portion, said interferometer receiving said majority portion; and a signal corrector connected to said processor and receiving said minority portion and correcting one of said interferometer output signal and said interferometer input signal to remove undesirable characteristics therefrom.

11. The apparatus according to claim 10, further comprising:

a reference arm coupled to a reference physical influence;

a sensing arm coupled to a sensed physical influence;

a coupler/splitter connected to said reference arm and said sensing arm, said coupler/splitter receiving said majority portion of said interferometer input signal, said reference arm generating a reference arm return signal and said sensing arm generating a sensing arm return signal; and said coupler/splitter combining said reference arm return signal and said sensing arm return signal to generate said interferometer output signal.

12. The apparatus according to claim 11, where in said known optical frequency-time profile is one chosen from a group consisting of a sawtooth ramp and a triangular wave and wherein said interferometer output signal has a frequency correlated by said processor to said absolute static measurement value of said physical influence.

13. The apparatus according to claim 11, wherein said interferometer output signal has a phase difference between alternating bursts correlated by said processor to said absolute static measurement value of said physical influence.

14. An apparatus for obtaining an absolute measurement value of a physical influence, comprising:

an electrical system comprising a laser controlled by a processor, said laser generating an interferometer input signal having a specific optical frequency-time profile, wherein the frequency-time profile of said interferometer input signal is a pair of linear ramps of equal slopes having alternating low and high starting points that generates a pair of intensity oscillation bursts in said interferometer output signal; and an optical system comprising an interferometer connected to said electrical system, said interferometer coupled to a physical influence to generate an interferometer output signal received by a processor, said processor correlating said interferometer output signal with an absolute static measurement value of said physical influence.

15. The apparatus according to claim 14, wherein said optical system further comprises:

a splitter for partitioning said interferometer input signal into a minority portion and a majority portion; and a signal corrector connected to said processor and receiving said minority portion, said signal corrector and said processor removing undesirable characteristics from said interferometer output signal and said interferometer input signal.

16. The apparatus according to claim 14, wherein said optical system further comprises:

a splitter for partitioning said interferometer input signal into a minority portion and a majority portion; and a compensation arm connected to said processor and receiving said minority portion, said compensation and said processor removing amplitude variations of said interferometer output signal.

17. The apparatus according to claim 14, wherein said optical system further comprises:

a splitter for partitioning said interferometer input signal into a minority portion of a majority portion; and a linearization arm connected to said processor and receiving said minority portion, said linearization arm and said processor removing non-linearities in the frequency-time profile of the interferometer input signal.

18. The apparatus according to claim 15, wherein said optical system further comprises:

a coupler/splitter for splitting said majority portion of said interferometer input signal into a reference incident signal and a sensing incident signal;

a reference arm connected to said coupler/splitter for receiving said reference incident signal and generating a reference arm return signal corresponding to a reference physical influence;

a sensing arm connected to said coupler/splitter for receiving said sensing incident signal and generating a sensing arm return signal corresponding to a sensing physical influence; and said coupler/splitter combining said reference arm return signal and said sensing arm return signal to generate said interferometer output signal.

19. The apparatus according to claim 18, wherein said interferometer input signal has one of a sawtooth ramp frequency-time profile and a triangular wave frequency-time profile that generates a beat signal in said interferometer output signal and wherein said processor measures one of the frequency and the period of said beat signal to obtain an absolute static measurement value associated with said reference physical influence and said sensing physical influence.

20. The apparatus according to claim 18, wherein said processor measures the phase difference of said pair of intensity oscillation bursts to obtain an absolute static measurement value associated with said reference physical influence and said sensing physical influence.

21. The apparatus according to claim 18, wherein:

said sensing arm is coupled to a first sensing device exposed to a first and a second physical influence and a second sensing device exposed to a third physical influence, and wherein said reference arm is coupled to a third sensing device exposed to said third and a fourth physical influence and a fourth sensing device exposed to said second physical influence, said coupler/splitter combining said sensing arm return signal and said reference arm return signal to cancel the exposure of said first sensing device to said second physical influence and the exposure of said third sensing device to said third physical influence.

22. The apparatus according to claim 21, wherein said coupler is received within a central housing, and wherein said first and fourth sensing devices are contained within a first housing, and said second and said third sensing devices are contained within a second housing.

23. The apparatus according to claim 21, wherein said coupler, said first sensing device and said fourth sensing device are contained within a first housing, and wherein said second sensing device and said third sensing device are contained within a second housing.

24. An apparatus for cancelling the effects of undesired physical influences on the measurement of desired physical influences, comprising:

an electrical system generating an interferometer input signal;

an interferometer connected to said electrical system and receiving said interferometer input signal, said interferometer exposing said interferometer input signal to desired physical influences and undesired physical influences and generating an interferometer output signal, said interferometer cancelling the effects of said undesired physical influences, wherein said interferometer comprises a coupler/splitter for splitting said interferometer input signal into a first incident signal and a second incident signal, a first arm receiving said first incident signal and exposing said first incident signal to said desired physical influences and said undesired physical influences and generating a first arm return signal, a second arm receiving said second incident signal and exposing said second incident signal to said undesired physical influences and said desired physical influences to generate a second arm return signal, said coupler splitter receiving said first arm return signal and said second arm return signal to generate said interferometer output signal; and a processor receiving said interferometer output signal to generate a measurement value corresponding to an absolute static value of said desired physical influences.

25. The apparatus according to claim 24, wherein said first arm is coupled to a first sensing device exposed to a first desirable physical influence and a first undesirable physical influence and a second sensing device exposed to a second undesirable physical influence, and wherein said second arm is coupled to a third sensing device exposed to a second desirable physical influence and said second undesirable physical influence and a fourth sensing device exposed to said first undesirable physical influence, said coupler/splitter combining said sensing arm return signal and said reference arm return signal to cancel the exposure of said first sensing device to said first undesirable; physical influence and the exposure of said third sensing device to said second undesirable physical influence.

26. The apparatus according to claim 25, wherein said first desirable physical influence is a pressure exerted by a liquid;

said first undesirable physical influence is a temperature of said liquid;

said second desirable physical influence is a pressure exerted by a gas above said liquid; and wherein said second undesirable physical influence is a temperature of said gas associated with said liquid, said processor monitoring said interferometer output signal to determine a volume value associated with said liquid.

* * * * *